United States Patent [19]
Thompson

[11] Patent Number: 5,337,952
[45] Date of Patent: Aug. 16, 1994

[54] ADAPTIVE MICROPROCESSOR CONTROL SYSTEM AND METHOD FOR PROVIDING MULTIPLE HEATING MODES IN TWINNED FURNACES

[75] Inventor: Kevin D. Thompson, Indianapolis, Ind.

[73] Assignee: Carrier Corporation, Syracuse, N.Y.

[21] Appl. No.: 98,230

[22] Filed: Jul. 28, 1993

[51] Int. Cl.⁵ .............................................. F24D 5/00
[52] U.S. Cl. ...................................... 236/10; 236/46 E
[58] Field of Search ................ 236/10, 11, 1 E, 1 EA, 236/1 EB, 46 R, 46 E, 46 F, 15 BG, 9 R

[56] References Cited

U.S. PATENT DOCUMENTS

| | | | |
|---|---|---|---|
| 4,356,962 | 11/1982 | Levine | 236/11 |
| 4,425,930 | 1/1984 | Kruto | 131/1 |
| 4,638,942 | 1/1987 | Ballard | 236/10 |
| 4,667,874 | 5/1987 | Johnson et al. | 236/46 EX |
| 4,725,001 | 2/1988 | Carney et al. | 236/11 |
| 4,887,767 | 12/1989 | Thompson | 236/1 EB |
| 4,907,737 | 3/1990 | Williams | 236/11 |
| 4,938,684 | 7/1990 | Karl et al. | 236/46 FX |
| 4,982,721 | 1/1991 | Lynch | 126/116 A |
| 5,027,789 | 7/1991 | Lynch | 126/116 A |
| 5,197,664 | 3/1993 | Lynch | 236/11 |

*Primary Examiner*—Harry B. Tanner

[57] ABSTRACT

In a heating system containing twinned furnaces capable of independently operating at multiple levels, a method for providing multiple heating modes to satisfy a required heating load during a given cycle, there being some total number of heating modes, wherein each heating mode may be activated for a time interval whose length is a function of furnace activity during the most recent previous cycle. The method comprises the steps of: determining the existence of a heating load to be satisfied; operating both furnaces independently at levels appropriate to a first heating mode for a first time interval that does not exceed a first predetermined limit; for each subsequent heating mode up to a number of one less than the total number of heating modes, operating both furnaces independently at levels appropriate to each subsequent heating mode for a subsequent time interval that does not exceed a subsequent predetermined limit; and operating both furnaces independently at levels appropriate to a final heating mode for a final time interval until the heating load is satisfied; calculating a thermal load requirement, as a function of all of the time intervals; and predetermining all of the predetermined time intervals for a next cycle, from the calculated thermal load requirement.

7 Claims, 12 Drawing Sheets

ADAPTIVE MICROPROCESSOR CONTROL SYSTEM AND METHOD FOR PROVIDING MULTIPLE HEATING MODES IN TWINNED FURNACES

BACKGROUND OF THE INVENTION

1. Field of the Invention

The present invention pertains to furnaces, and more particularly to a microprocessor control system and method for providing multiple heating modes in twinned furnaces utilizing a single stage thermostat.

2. Description of the Prior Art

Presently, many furnace controls include a two-stage thermostat for providing dual rate heating, wherein the first stage of the thermostat operates the furnace on low heat and the second stage of the thermostat operates the furnace on high heat. For example, a typical two-stage thermostat comprises two small mercury bulb contacts on a bi-metal sensor that close and open as a function of the movement of the bi-metal sensor in response to changing room temperatures. If the present room temperature is below a desired temperature set point, for example, one degree to two degrees below the set point, then the low mercury heat bulb contact closes to provide low heat. If the room temperature continues to drop to, for example, three degrees below the desired temperature set point, then the second mercury bulb contact closes to provide a high rate of heat. When the heating load is satisfied, both of the mercury bulb contacts in the thermostat will sequentially open or deactivate, thereby terminating the heating cycle. Thereafter, when the thermostat contacts close indicating a new heating load to be satisfied, the furnace control repeats the same identical heating cycle.

There are situations, however, where it is necessary or desirable to use two furnaces twinned together in order to provide sufficient heat for a given enclosure. This happens in the instance of large residences or commercial installations where no product in the furnace model line being used provides sufficient Btu for the needs of the installation. The physical linkage of two furnaces to achieve twinning is well known in the art.

In the prior art, twinned furnaces were generally linked together functionally so that both furnaces functioned identically as to heat provision. Thus two single stage furnaces twinned together could either both run or both not run, providing a single heating mode twinned furnace. If two stage furnaces were twinned, then either both ran in high heat, both ran in low heat, or both were off. The only way a third heating mode could be achieved was by the use of a three-stage thermostat. To do this was costly, and, even so, the blowers in both furnaces could run at different speeds.

In an earlier patent, U.S. Pat. No. 4,638,942 to Ballard et al., assigned to a common assignee, an adaptive microprocessor control system and method was taught for a single furnace which overcame the disadvantages of the requirement for a two-stage thermostat for providing dual rates of heat and the existence of large swings in room temperature. In my co-pending application Ser. No. 08/090,340 filed on Jul. 12, 1993, additional disadvantages were overcome for a single furnace, with a system which recovers quickly from setback such as, in particular, night-setback. That system also reduces off-cycle electrical power draw, which reduction can result in savings on the average cost of operation of the furnace. It is desirable to provide the latter benefits, when twinned furnaces are used, as well as allowing for the provision of multiple heating modes using a single stage thermostat, and also avoiding large swings in room temperature.

SUMMARY OF THE INVENTION

It is therefore a primary object of the present invention to provide an improved furnace control and method therefore for twinned furnaces.

It is another object of the present invention to provide a furnace control and method for twinned furnaces that utilizes a single stage thermostat for providing multiple modes of heat.

It is still another object of the present invention to provide a furnace control and method for twinned furnaces that uses an adaptive furnace control scheme that satisfies the heating load as a function of the last heating cycle performance.

A further object of the present invention is to provide a furnace control and method for twinned furnaces that consumes less energy, by providing a minimum amount of high heat and by reducing off-cycle electrical power draw.

It is yet another object of the present invention to provide a furnace control and method for twinned furnaces that allows faster recovery from setback conditions, particularly night set-back.

It is still a further object of the present invention to provide a furnace control and method for twinned furnaces that is more compatible with zoning by increasing low fire mode run time and the speed of recovery from system changes.

These and other objects of the present invention are attained by, in a heating system containing twinned furnaces capable of independently operating at multiple levels, a method for providing multiple mode heating to satisfy the heating load during a given cycle, there being some total number of heating modes, wherein each heating mode may be activated for a time interval whose length is a function of furnace activity during a most recent previous cycle. This method comprises the steps of: determining the existence of a heating load to be satisfied; operating both furnaces independently at levels appropriate to a first heating mode for a first time interval that does not exceed a first predetermined limit; for each subsequent heating mode up to a total of one less than the total number of heating modes, operating both furnaces independently at levels appropriate to each subsequent heating mode for a subsequent time interval that does not exceed a subsequent predetermined limit; and operating both furnaces independently at levels appropriate to a final heating mode for a final time interval until the heating load is satisfied; calculating a thermal load requirement as a function of all of the time intervals; and predetermining all of the predetermined time intervals for a next cycle from the calculated thermal load requirement.

BRIEF DESCRIPTION OF THE DRAWINGS

For a better understanding of these and other objects of the present invention, reference is made to the detailed description of the invention which is to be read in conjunction with the following drawings, wherein.

DETAILED DESCRIPTION OF THE INVENTION

Figure 1:
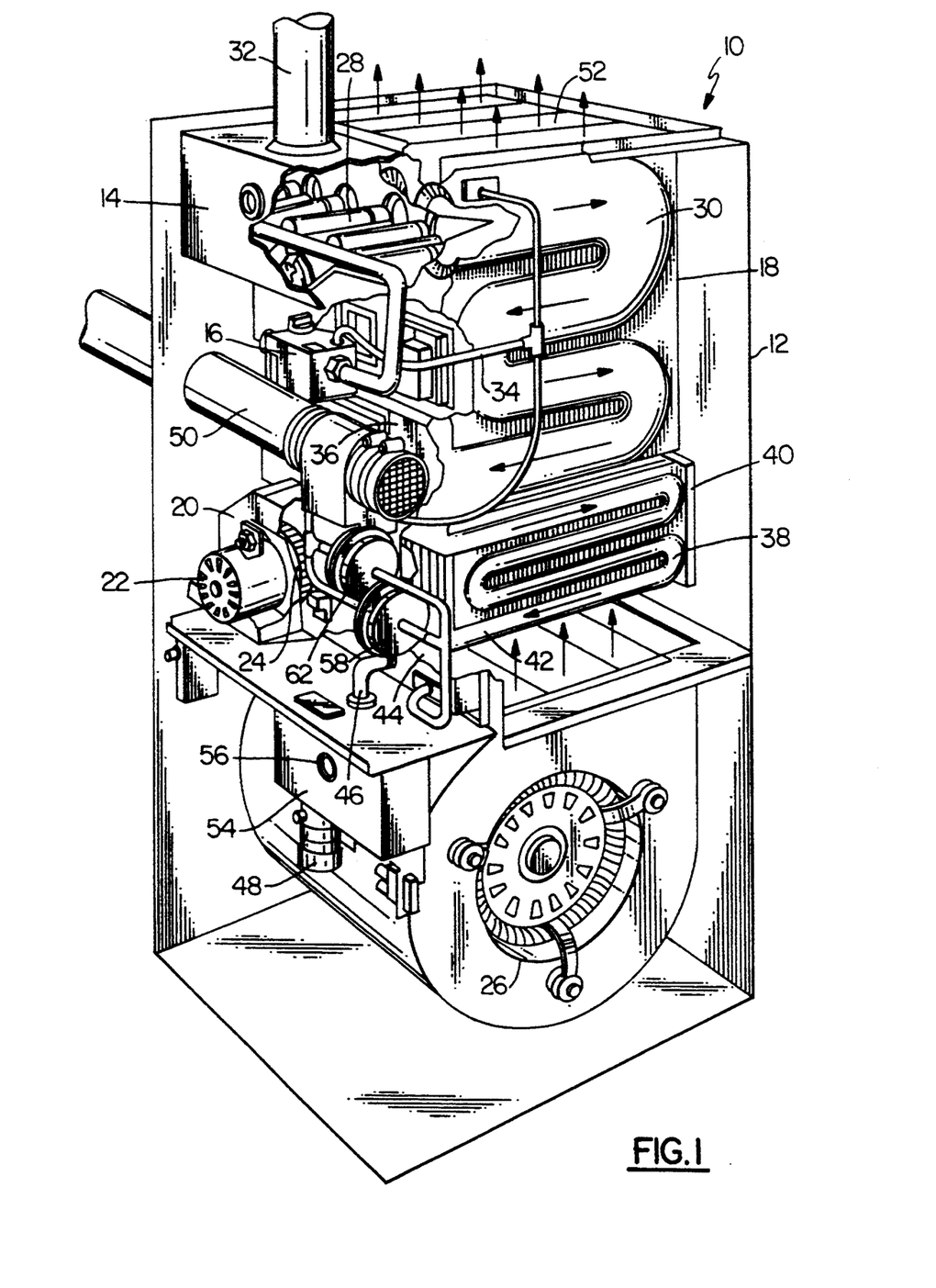
FIG. 1 is a partially broken-away side elevational view of one of a pair of twinned furnaces incorporating the principles of the present invention.

Referring to FIG. 1, there is illustrated a gas-fired furnace which may be operated according to the principles of the present invention. The following description is made with reference to two-stage condensing furnace 10, which is appropriate for use with the second embodiment to be described below, but it should be understood that the present invention contemplates incorporation with other furnace types. Specifically the first embodiment is appropriate to twinned single stage furnaces such as Carrier's condensing and mid-efficiency furnaces and the second embodiment is appropriate for use with twinned two-speed and variable speed furnaces.

Referring now to FIG. 1, condensing furnace 10 includes in major part steel cabinet 12, housing therein burner assembly box 14, combination gas control 16, heat exchanger assembly 18, inducer housing 20 supporting inducer motor 22 and inducer wheel 24, and circulating air blower 26. Combination gas control 16 includes pilot circuitry for controlling and proving the pilot flame. This pilot circuitry or control can be a SCP, Inc. Model 740A pilot obtainable from UTEC, Huntington, Ind. Combination gas control 16 can provide dual rates of gas flow to burner assembly 14, a low gas flow rate and a high gas flow rate.

Burner assembly 14 includes at least one inshot burner 28 for at least one primary heat exchanger 30. Burner 28 receives a flow of combustible gas from combination gas control 16 and injects the fuel gas into primary heat exchanger 30. Part of the injection process includes drawing air into heat exchanger assembly 18 so that the fuel gas and air mixture may be combusted therein. A flow of combustion air is delivered through combustion air inlet 32 to be mixed with the gas delivered to burner assembly 14.

Primary heat exchanger 30 includes an outlet 34 opening into chamber 36. Connected to chamber 36 and in fluid communication therewith are four condensing heat exchangers 38, only one of which is shown, having an inlet 40 and an outlet 42. Outlet 42 opens into chamber 44 for venting exhaust flue gases and condensate.

Inducer housing 20 is connected to chamber 44 and has mounted therewith inducer motor 22 with inducer wheel 24 for drawing the combusted fuel air mixture from burner assembly 14 through heat exchanger assembly 18. Air blower 26 delivers the air to be heated upwardly through air passage 52 and over heat exchanger assembly 18, and the cool air passing over condensing heat exchangers 38 lowers the heat exchanger wall temperature below the dew point of the combusted fuel air mixture causing a portion of the water vapor in the combusted fuel air mixture to condense, thereby recovering a portion of the sensible and latent heat energy. The condensate formed within heat exchangers 38 flows through chamber 44 into drain tube 46 to condensate trap assembly 48. As air blower 26 continues to urge a flow of air to be heated upwardly through heat exchanger assembly 18, heat energy is transferred from the combusted fuel air mixture flowing through heat exchangers 30 and 38 to heat the air circulated by blower 26. Finally, the combusted fuel air mixture that flows through heat exchangers 30 and 38 exits through outlet 42 and is then delivered by inducer motor 22 through exhaust gas outlet 50 and thence to a vent pipe (not shown) Both inducer motor 22 and the motor (not shown) for air blower 26 are electronically commutated to provide variable speed operation.

Cabinet 12 also houses microprocessor control 54, LED display 56, low pressure switch 58, and high pressure switch 62. Switches 58 and 62 are plumbed in parallel such that each senses the differential pressure between chamber 44 and burner assembly box 14. Low pressure switch 58 closes as the pressure increases and will open when the pressure decreases below a first predetermined pressure. High pressure switch 62 operates similarly with respect to a second predetermined pressure that is greater than the first predetermined pressure.

Figure 2:
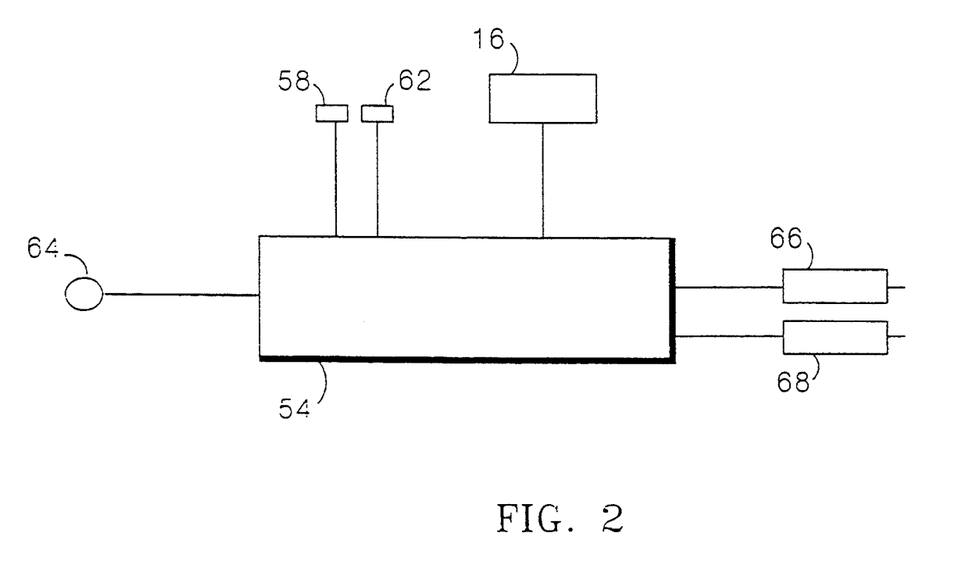
FIG. 2 is a block diagram of a portion of the furnace control system.
Figures 3, 3A:
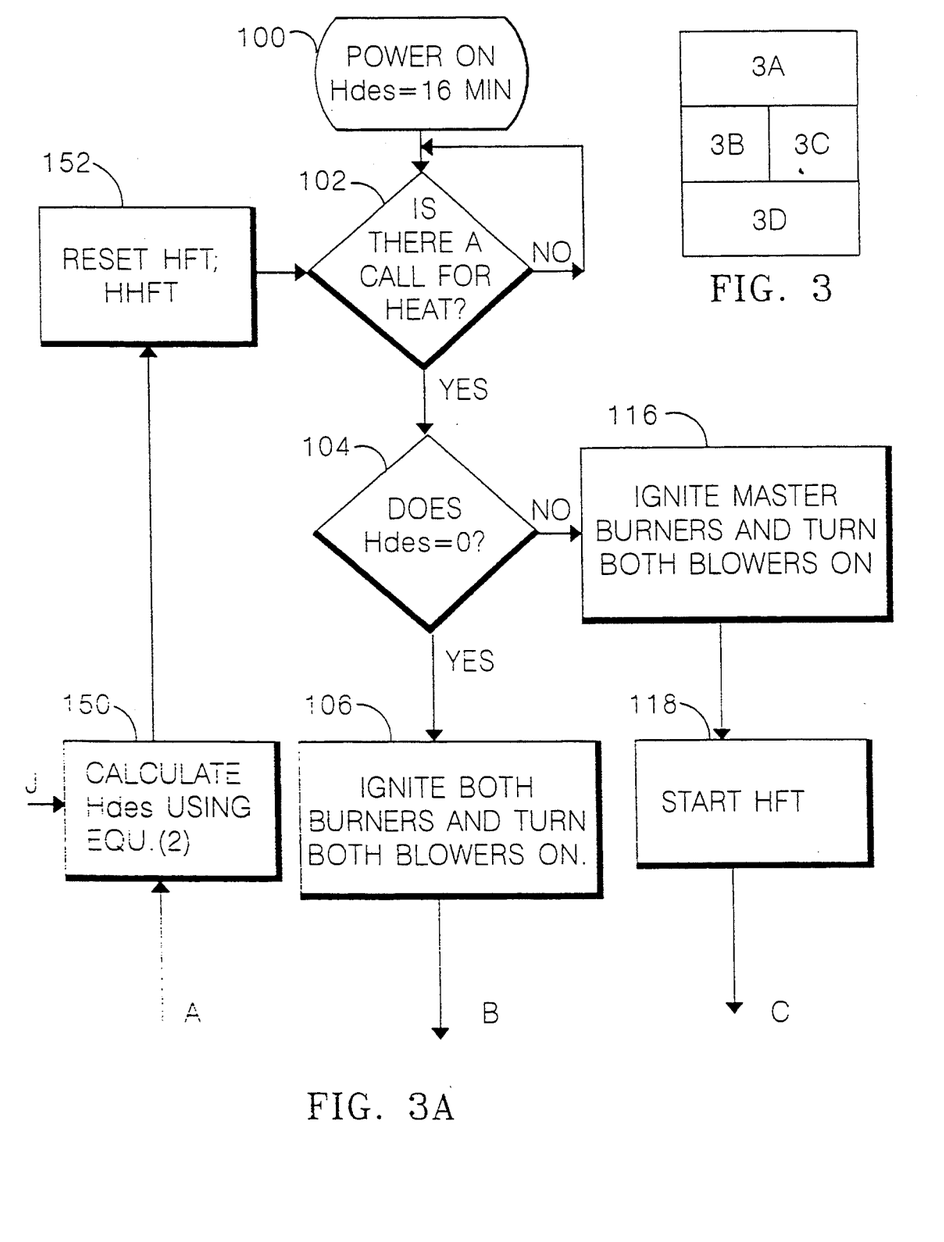
FIGS. 3A through 3D, taken together comprise a flow diagram illustrating one embodiment of the invention as applied to the heating cycle of a control system for twinned single-stage furnaces.
Figure 3B:
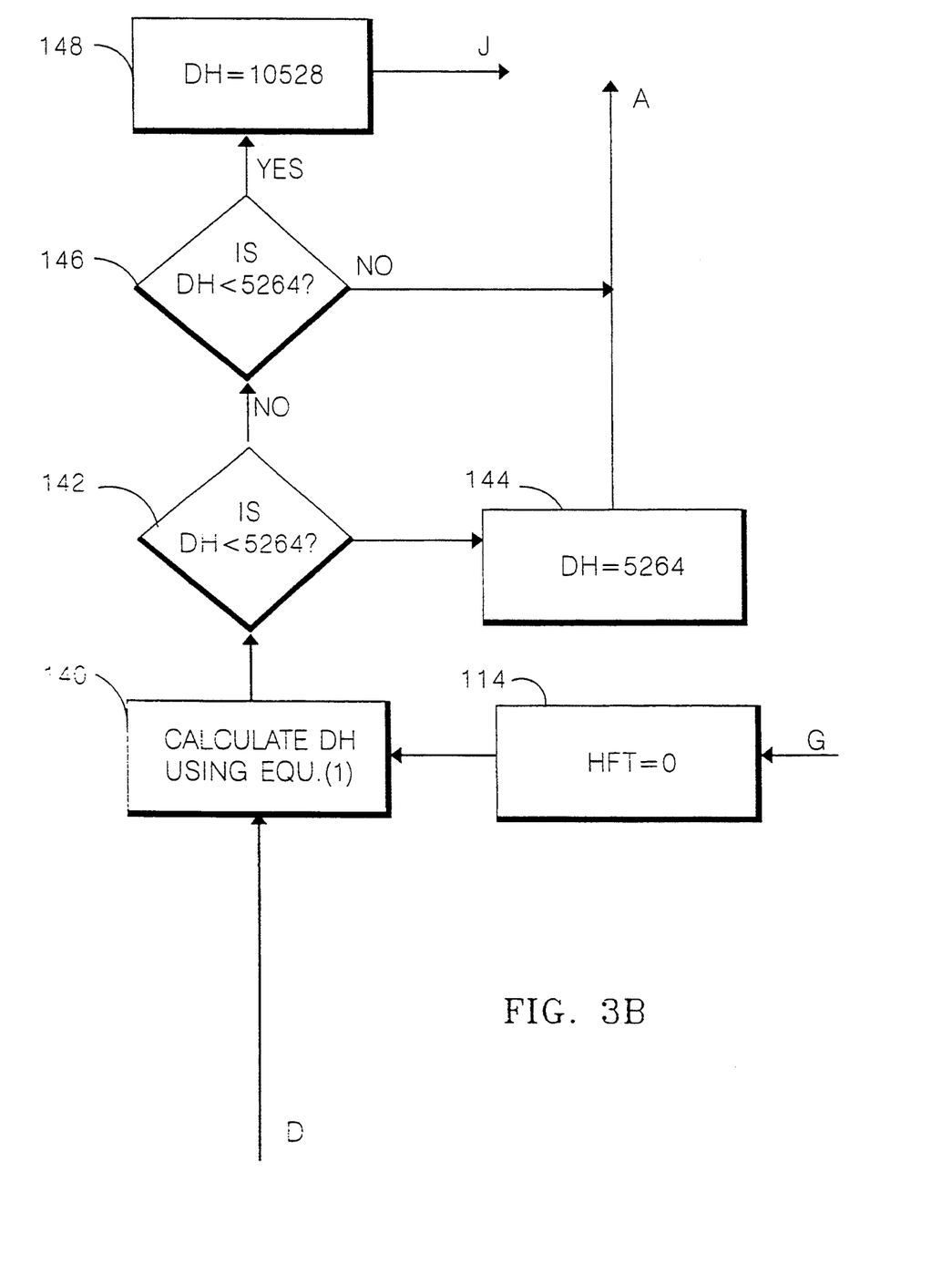
Figure 3C:
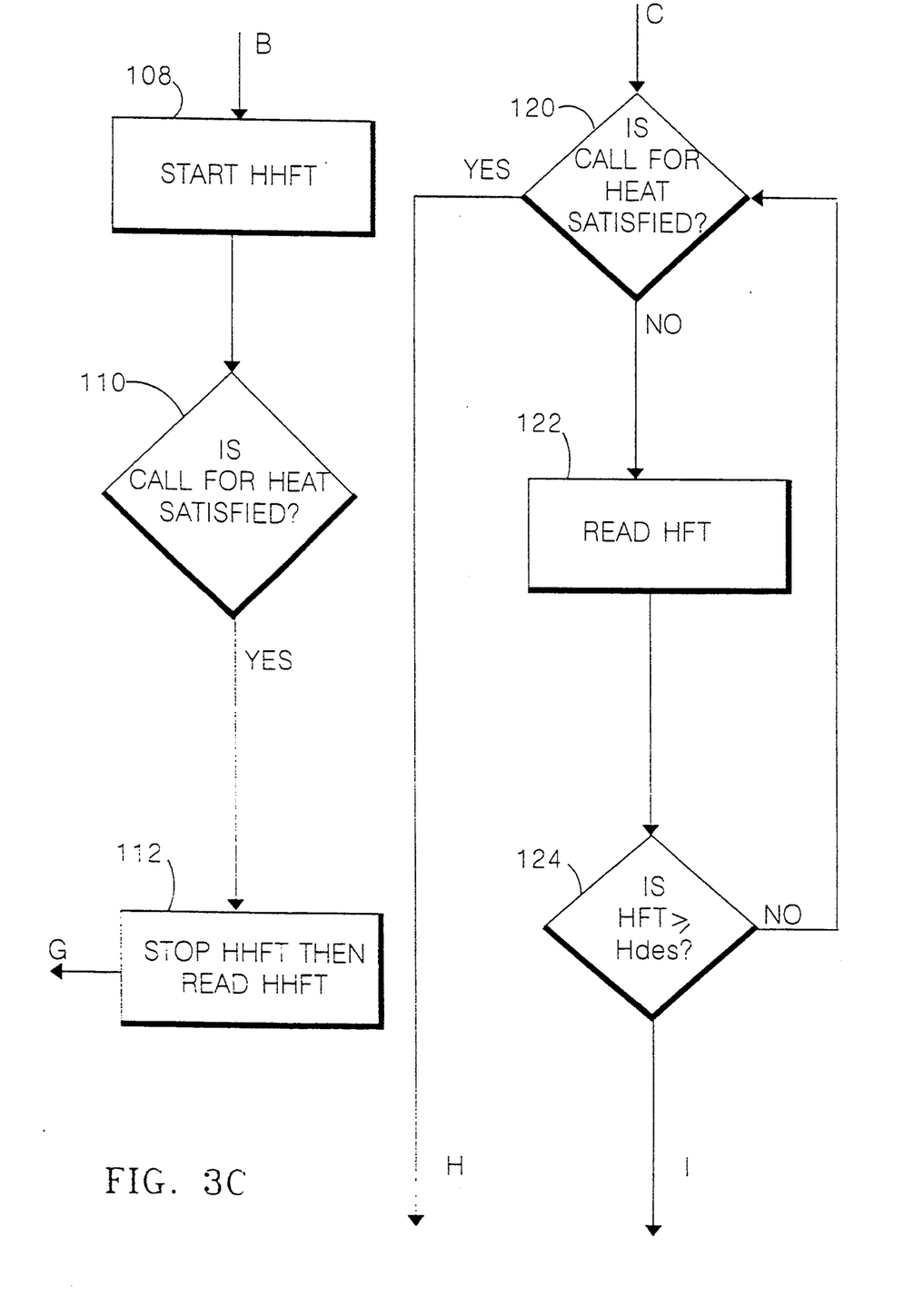
Figure 3D:
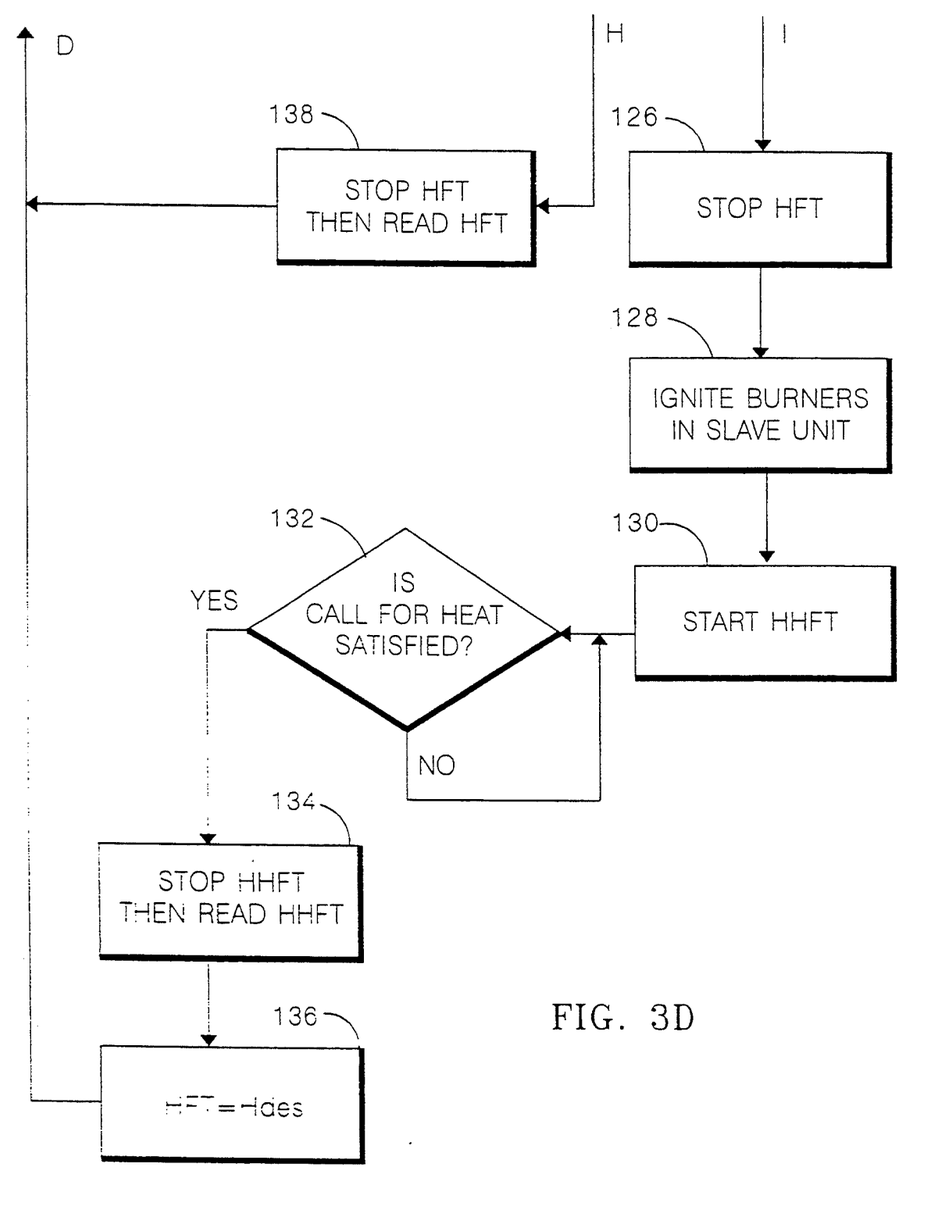
Figures 4, 4A:
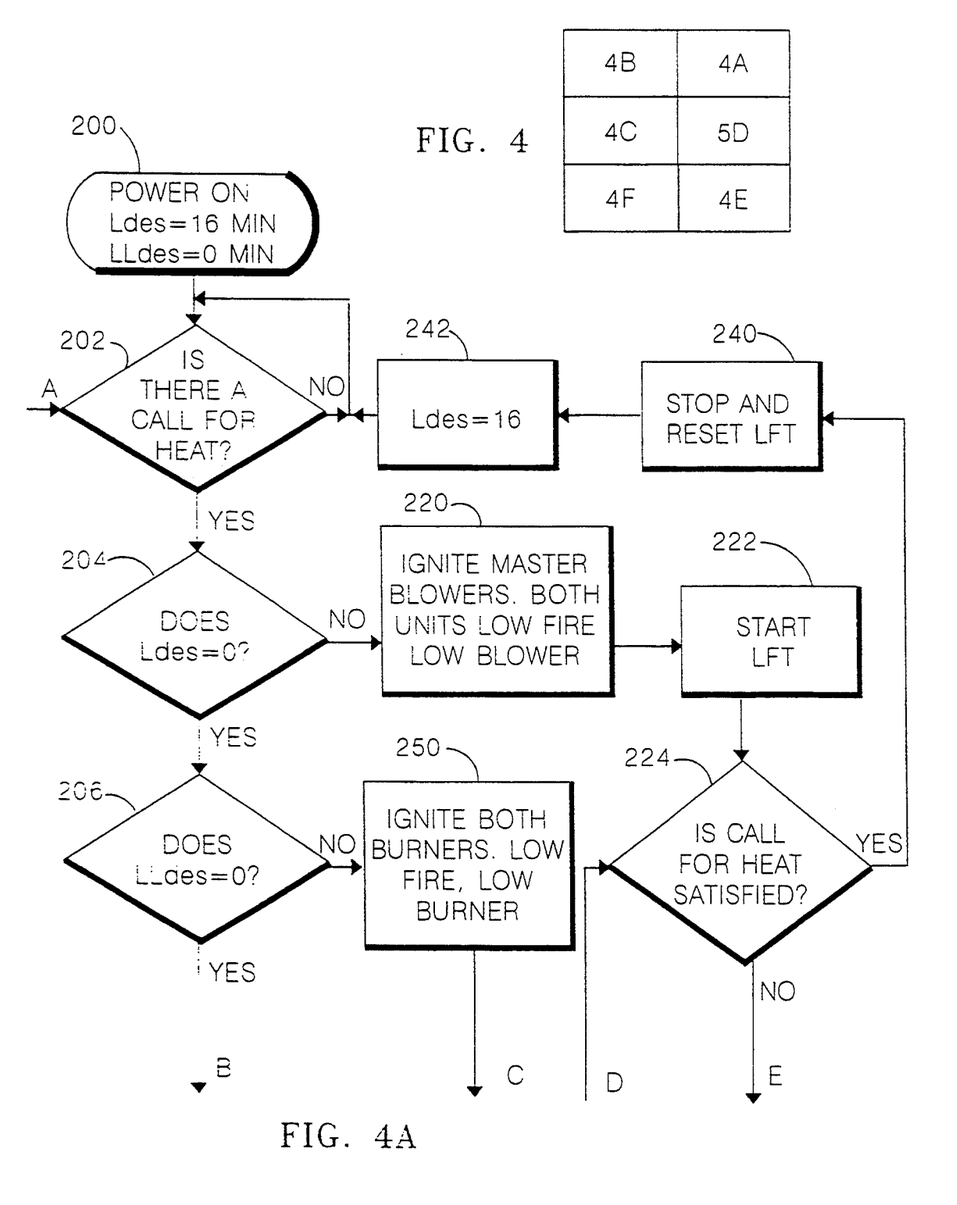
FIGS. 4A through 4F taken together comprise a flow diagram illustrating a second embodiment of the invention as applied to the heating cycle of a control system for twinned two-stage furnaces.
Figure 4B:
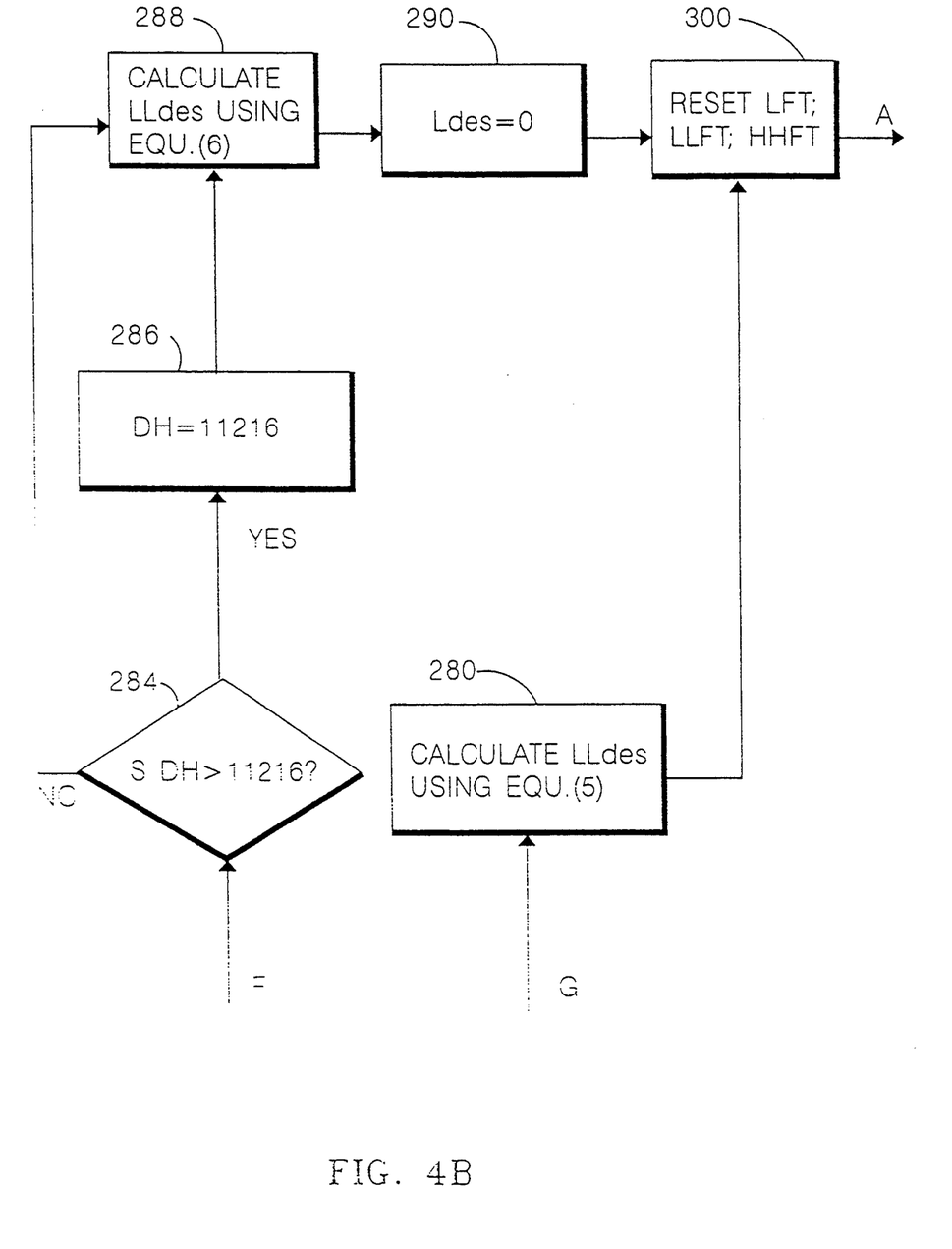
Figure 4C:
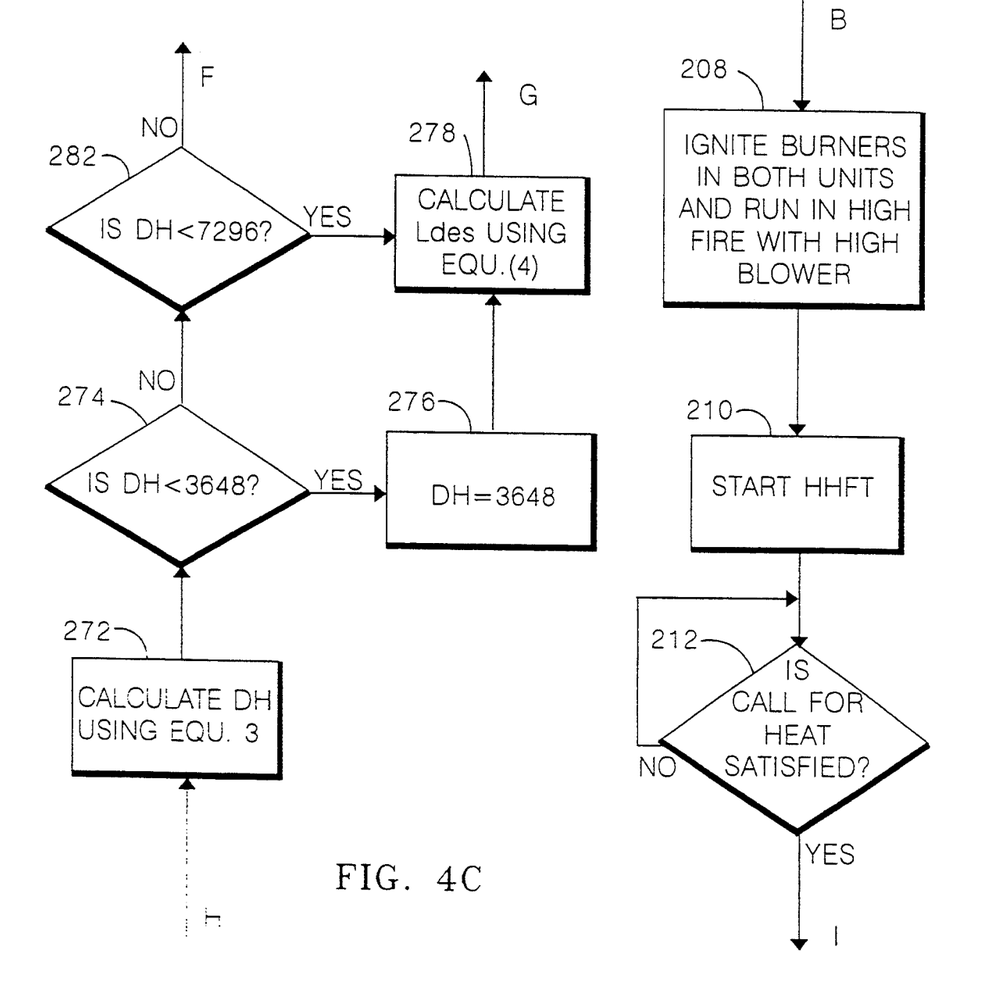
Figure 4D:
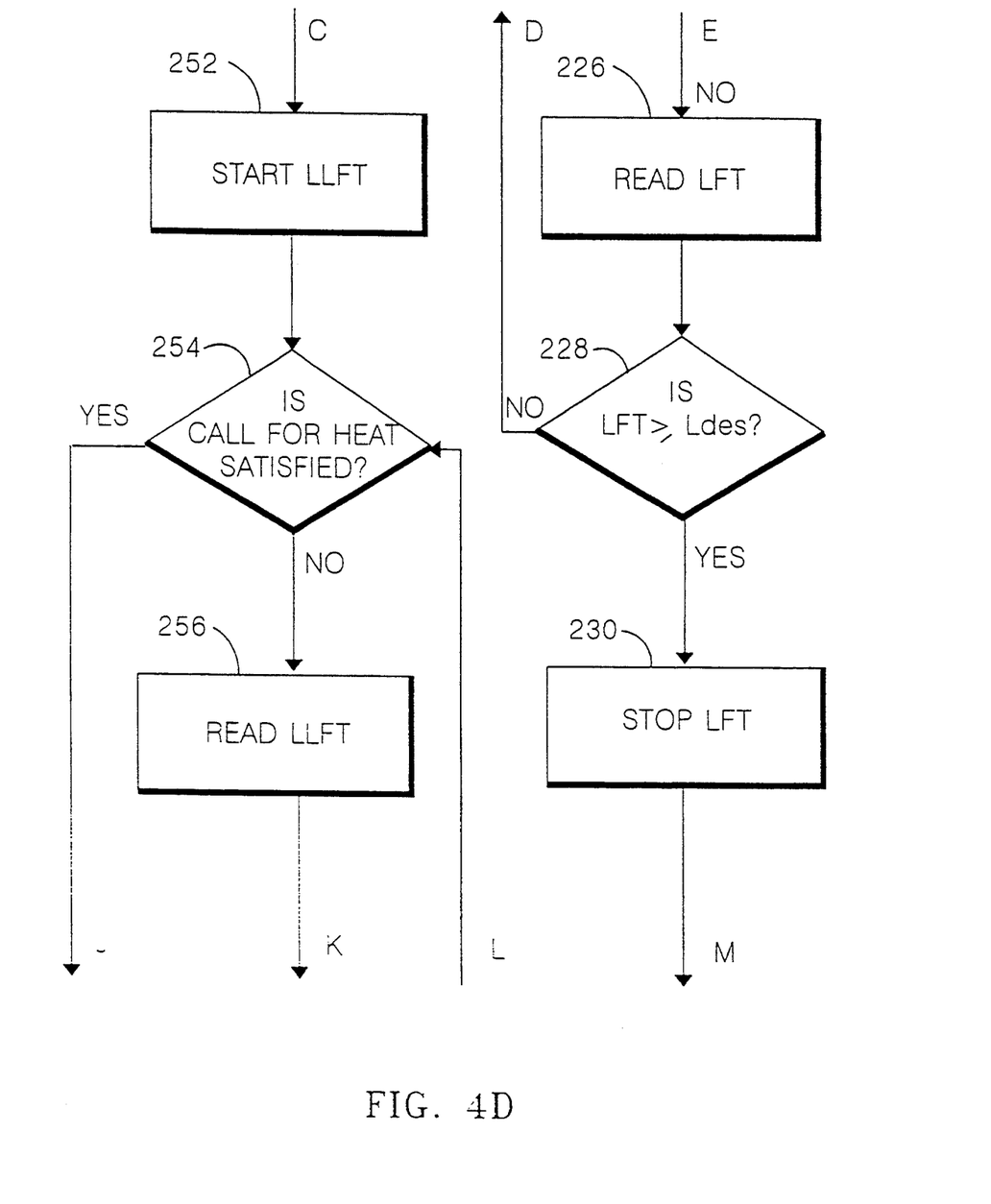
Figure 4E:
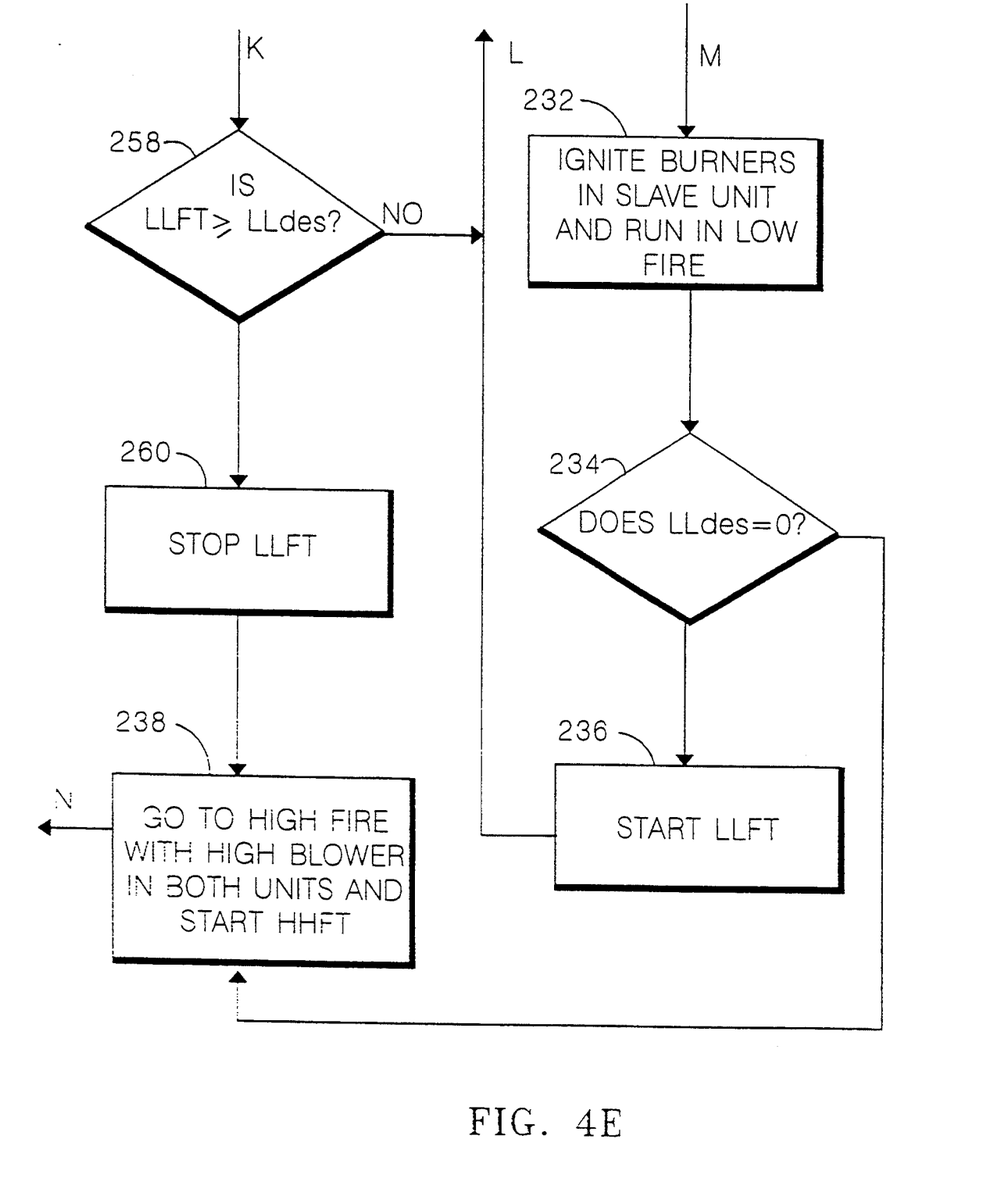
Figure 4F:
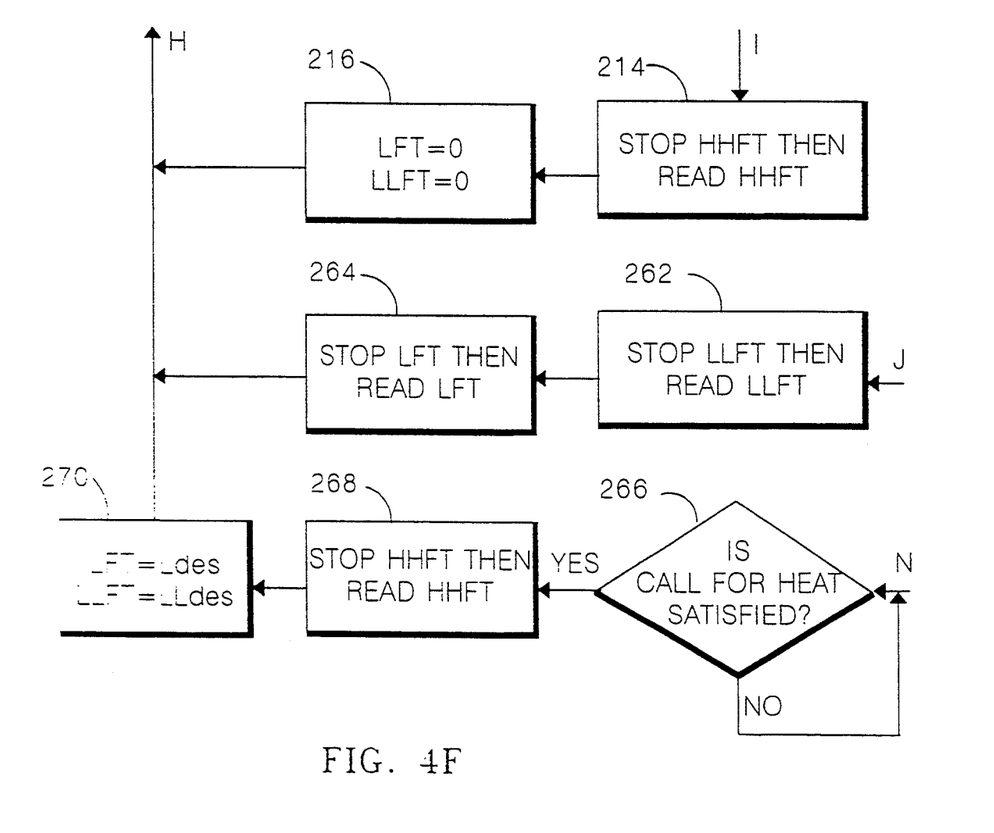

Referring to FIG. 2, there is illustrated a simplified block diagram showing the interconnection between microprocessor control 54 and pressure switches 58, 62, thermostat 64, gas valve 16, air blower motor control 66 for air blower 26, and inducer motor control 68 for motor 22. Both control 66 and 68 generate respective RPM pulse signals and contain respective optical couplers to isolate the respective RPM pulse output signal. Thermostat 64 is a single stage-type thermostat, i.e., has one mercury bulb contact.

The present invention provides an improved adaptive microprocessor control for furnishing multiple heat modes in a pair of twinned furnaces as a function of the previous heating cycle. In particular, the present invention allows faster recovery from night setback, and optimizes the use of heat by the system.

In the description that follows with reference to FIGS. 3A-3D and 4A-4F, each of the steps can represent a subroutine or a series of steps in the heating cycle. Microprocessor control 54 has its control logic programmed to follow instructions given at each step. Control 54 is programmed to receive input, process the input, and generate output in response thereto.

Referring now to FIGS. 3A-3D, this flow chart represents an embodiment of the instant invention in which twinned single speed furnaces are capable of operating at two modes: a high heat mode having burner operation in one unit and a high/high heat mode having burner operation in both units. In both cases both blowers 26 are operative.

Initially, in step 100, the power is turned on and the first heating cycle begins. For the first cycle the value of $H_{des}$, the desired amount of time to be spent in high heat mode, is set to sixteen (minutes). The following step, 102 represents the thermostat 64 sensing whether or not there is a heating load to be satisfied. If there is such a load, the thermostat's single stage contact is closed and a signal is generated to the microprocessor control 54 indicating a need for heat. This test is performed repeatedly until such time as a call for heat is generated. When a call for heat is recognized, the system proceeds to step 104, and the microprocessor determines whether or not $H_{des}$ is equal to zero, which is equivalent to asking whether a period during which only one furnace has it burners 28 operating, is required.

In the initial cycle, $H_{des}$ (the desired time period during which the system will run in high fire mode) will have been set to sixteen and so a high fire mode period will be ensured, beginning at step 116.

Similarly if, in subsequent cycles, a period of high fire mode is required, then in step 116, the burners 28 are ignited in the first (master) unit and the blowers 26 are turned on in both units. Thus, the master unit operates at a "heat and blower on" level while the slave unit operates at a "only blower on" level. The software then initiates the running of the high fire timer (HFT) at step 118. At the next step 120, the thermostat 64 is queried to determine whether or not the demand for heat is satisfied. If the demand for heat is not satisfied, then the high fire timer is read at step 122 and the software at step 124 determines whether or not HFT is greater than or equal to the desired high fire mode time limit. If the value of HFT does not exceed or equal $H_{des}$, then the controlling software loops back to step 120.

On the other hand, if HFT is greater than or equal to $H_{des}$, then the high fire timer is stopped in step 126 and, in step 128, the burners 28 are ignited in the second (slaved unit) of the twinned furnaces. The high/high fire timer (read into variable HHFT) is started at step 130 and, in the following step 132, thermostat 64 is repeatedly queried to see whether or not the heat demand is satisfied, until such time that it is satisfied. Thereupon, in step 134, the high/high fire timer is stopped and read, thereby obtaining the time interval measurement for high/high fire mode. In step 136, it is noted that the value of $H_{des}$ is equal the previous value of the high fire timer. The calculation to determine DH is then performed in step 140 as will be described hereinafter.

Returning now to step 120 at which the thermostat 64 is queried after running in high fire mode, if the heat demand is satisfied after the system has operated with only one furnace in high fire mode, then in step 138 the high fire timer is stopped and read, and the calculation of step 140 is performed as will be described hereinafter.

Returning now to step 104 wherein $H_{des}$ was tested to determine whether or not it was zero, if it is the case that $H_{des}$ is equal to zero, (as it may be after the first cycle) then no period in high fire mode is desired and therefore in the following step 106, the burners 28 in both furnaces are ignited and the system is run in high-/high fire mode. The high/high fire timer is then started in step 108. In the following step 110 the thermostat 64 is repeatedly queried to see if the heat requirement is satisfied. At the time that the heat requirement is satisfied, the high/high fire timer is stopped and read in step 112, and HFT is seen to be zero in step 114, as no time was spent in high fire mode. The calculation as indicated in step 140 is then performed.

In the first calculation, step 140, the Btu load requirement (DH) to satisfy a call for heat is calculated by the following equation:

$$DH = (329 \times HFT) + (658 \times HHFT) \qquad \text{Equation 1}$$

Where:
329 is the output per cell in Btu/min when only the master furnace burners are operating.
658 is the output per cell in Btu/min×2 when both master and slave unit burners are operating.
HFT is the time of operation in minutes that only the master furnace burners operated during the previous cycle.
HHFT is the time of operation in minutes that both the master and slave furnace burners operated during the previous cycle.

The following step, 142 a determination is made as to whether the value DH is less than 5,624 (the maximum Btu load that can be satisfied in high heat). If it is, then in step 144 DH is set to be equal to 5,624 and in the following step 150, $H_{des}$ is calculated as will be described below. If, on the other hand, step 142 determines that DH is greater than or equal to 5,624, then, in step 146, a determination is made as to whether the value of DH is greater than 10,528 (the maximum Btu load requirement which can be satisfied in high/high heat). If it is not, then in the next step 150, $H_{des}$ is calculated as will be described below. If on the other hand DH is greater than 10,528, then the value of DH is set to 10,528 at step 148, and then step 150 is performed.

At step 150, $H_{des}$, is calculated using the following equation:

$$H_{des} = (10,528 - DH)/329 \qquad \text{Equation 2}$$

The system then resets the HFT and HHFT timers in step 152 and returns to step 102 wherein it cycles waiting for a call for heat from the thermostat 64. After the first cycle $H_{des}$ may be equal to zero in which case the entire cycle is spent in high/high fire mode, or it may be greater than zero in which case the high fire mode run will be for the length of time indicated by $H_{des}$ or until the call for heat is satisfied, whichever is shorter. An additional high/high fire mode run will occur if the thermostat 68 is not satisfied at the end of this time period.

In a second embodiment, depicted in FIGS. 4A–4F, a system for controlling three heating modes of operation of a pair of twinned two speed or variable speed furnaces is shown. The three modes available in this system are (1) low heat, in which both furnace blowers 26 are on at a low level and the burners 28 in the master furnace only are on at a low level, (2) low/low heat, in which both furnace blowers 26 are on at a low level and the burners 28 in both the master and slave furnaces are on at a low level, and (3) high heat in which both furnace blowers 26 are on at a high level and the burners 28 in both the master and slave furnaces are on at a high level. These modes correspond to very low heat, low heat, and high heat respectively. Initiating step 200 represents the powering on of the furnace whereupon the value of $L_{des}$, in the initial cycle, is initialized to sixteen (16), and the value of $LL_{des}$ to zero. $L_{des}$ is the desired time period during which the system will run in low fire mode and $LL_{des}$ is the desired time period during which the system will run in low/low fire mode. The following step, 202 represents the thermostat 64 sensing whether or not there is a heating load to be satisfied. If there is such a load, the thermostat's single stage contact is closed and a signal is generated to the microprocessor control 54 indicating a need for heat. This test is performed repeatedly until such time as a call for heat is generated. When a call for heat is recognized, the system proceeds to step 204, and the microprocessor determines whether or not $L_{des}$ is equal to zero, which is equivalent to asking whether a period in low fire mode is required. In the initial cycle, $L_{des}$ will have been set to sixteen and so a low fire mode period will be ensured, beginning at step 220.

Similarly if, in subsequent cycles, a period of low fire mode is required, then in step 220, both blowers 26 are run at low and the burners 28 in the master furnace are ignited and run in low fire mode. The software then initiates the running of the low fire timer (LFT) at step 222. At the next step 224, the thermostat 64 is queried to determine whether or not the demand for heat is satisfied. If the demand for heat is not satisfied, then the low fire timer is read at step 226 and the software at step 228 determines whether or not LFT is greater than or equal to the desired low heat operation time limit. If the value of LFT does not exceed or equal $L_{des}$, then the control system loops back to step 224.

On the other hand, if LFT is greater than or equal to $L_{des}$, then the low fire timer is stopped in step 230 and, in step 232, the burners 28 in the slave unit are also ignited so as to run in low/low fire. A determination is then made, in step 234, as to whether $LL_{des}$ is equal to zero, which it will be in the first cycle. If it is, then in step 238 both units are brought to high fire and their blowers 26 are also set to high. Thus, in the first cycle the master furnace will operate either 16 minutes or until the thermostat is satisfied, whichever is shorter; if the thermostat is not satisfied at the end of sixteen minutes, both furnaces will operate at high fire mode.

Returning now to step 224, if the thermostat is satisfied, then in step 240 the low fire timer is stopped and reset. The $L_{des}$ remains set at 16 minutes as shown in step 242, after which the control returns to step 202 until another call for heat occurs.

Continuing on from step 238, then, in step 266 a determination is continuously made as to whether or not the thermostat is satisfied, until such time as the thermostat is satisfied. Thereafter HHFT is stopped and read in step 268. In the following step, 270, the value of LFT will be the same as that of $L_{des}$ and the value of LLFT will be the same as that of $LL_{des}$. Thereafter calculation of DH are performed in step 272 as will be discussed below.

Returning, now, to step 234, if $LL_{des}$ does not equal zero then the LLFT is started in step 236 and the thermostat is queried to see if the call for heat is satisfied in step 254. If the call for heat is not satisfied, then LLFT is read in step 256 and a determination is made in step 258 as to whether LLFT is greater than or equal to $LL_{des}$. If it is not then control returns to step 254. If, on the other hand, it is, the LLFT is stopped in step 260 and the process continues from step 238 in high/high fire mode.

Returning, now, to step 254, if the thermostat is satisfied then in step 262, the low/low fire timer is stopped and read, and then the low fire timer is stopped and read in step 264, thereby obtaining the time interval measurements for both the low fire and the low/low fire modes. The calculation of step 272 is performed next.

Returning, now, to step 204, if the value of $L_{des}$ is zero, then the system is not to run in low fire mode for that cycle. The next determination made, in step 206, is whether the system is not to run in low/low fire mode either for that cycle, i.e. whether $LL_{des}$ is equal to zero. If $LL_{des}$ is not equal to zero then, in step 250 the burners 28 are ignited in both the master and slave furnace and both blowers 26 and burners 28 are run in low fire. In step 252 LLFT is started, followed by the step 254 test to determine if the call for heat is satisfied.

Returning now to step 206, if both $L_{des}$ and $LL_{des}$ are equal to zero, then both the master and the slave unit are run with high blower 26 and burners 28 on high fire in step 208 and the high/high fire timer started in step 210. In step 212 there is a continuous test to see if the request for heat is satisfied until such time as it is satisfied. HHFT is stopped and read in step 214 and, as indicated in step 216, LFT and LLFT are both zero. The calculation of step 272 is next performed wherein the Btu load requirement (DH) to satisfy a call for heat is calculated by the following equation:

$$DH = (228 \times LFT) + (456 \times LLFT) + (701 \times HHFT) \quad \text{Equation 3}$$

Where:
- 228 is the low fire output per cell in Btu/min when only the master furnace burners are operating.
- 456 is the low fire output per cell in Btu/min×2 when both master and slave unit burners are operating.
- 701 is the high fire output per cell in Btu/min×2 when both master and slave unit burners are operating.
- LFT is the low fire time of operation in minutes that only the master furnace burners operated during the previous cycle.
- LLFT is the low fire time of operation in minutes that both the master and slave furnace burners operated during the previous cycle.
- HHFT is the high fire time of operation in minutes that both the master and slave furnace burners operated during the previous cycle.

In the following step, 274, a determination is made as to whether DH is less than 3,648. If it is then DH is set to 3,648 in step 276 and $L_{des}$ is calculated using Equation 4 in step 278 as follows:

$$L_{des} = (7{,}296 - DH)/228 \quad \text{Equation 4}$$

After step 278 $LL_{des}$ is calculated in step 280 using equation 5 as follows:

$$LL_{des} = 16 - L_{des} \quad \text{Equation 5}$$

Next, the timers LFT, LLFT and HFT are reset in step 300. This completes the cycle, and control is transferred to step 202 to wait for a call for heat.

If, on the other hand, the test of step 274 shows DH to be greater than or equal to 3,648, then in step 282 a determination is made as to whether DH is less than 7,296. If it is, then the calculation of step 278 is performed. If it is not, then in step 284 DH is again tested to see if it is greater than 11,216. If it is, then DH is set to 11,216 in step 286, and in either case $LL_{des}$ is then calculated in step 288 using the following equation:

$$LL_{des} = (11{,}216 - DH)/245 \quad \text{Equation 6}$$

In this case, $L_{des}$ is 0 as indicated in step 290. Thereafter the timer reset step 300 is performed.

Thus, the system of this invention will operate from a conventional room thermostat. However the system will be adaptive in that the control unit will modify the behavior of the twinned units' operation in a given heating cycle based on the system's performance in the previous cycle. Optimal performance can be achieved as long as the room thermostat anticipator setting is properly selected.

It should be noted that while this system has been described with respect to obtaining a two heating mode system using twinned single speed furnaces or a three heating mode system using twinned two-speed furnaces, this method is equally capable of obtaining four modes of heating using twinned three stage furnaces or up to 1+n heating modes where each of the twinned furnaces has n different stages.

While this invention has been explained with reference to the structure disclosed herein, it is not confined to the details set forth and this application is intended to cover any modifications and changes as may come within the scope of the following claims:

What is claimed is:

1. In a heating system containing twinned furnaces capable of independently operating at multiple levels, a method for providing multiple heating modes to satisfy a required heating load during a given cycle, there being some total number of heating modes, wherein each heating mode may be activated for a time interval whose length is a function of furnace activity during a most recent previous cycle, comprising the steps of:

determining an existence of a heating load to be satisfied;

operating both furnaces independently at levels appropriate to a first heating mode for a first time interval that does not exceed a first predetermined limit;

for each subsequent heating mode up to a number of one less than the total number of heating modes, operating both furnaces independently at levels appropriate to said subsequent heating mode for a subsequent time interval that does not exceed a subsequent predetermined limit; and operating both furnaces independently at levels appropriate to a final heating mode for a final time interval until the heating load is satisfied;

calculating a thermal load requirement as a function of all of said time intervals; and predetermining all of said predetermined time intervals for a next cycle from the calculated thermal load requirement.

2. The method of claim 1, further comprising the steps of:

determining if the heating load is satisfied while both furnaces are operating for each given heating mode;

if the heating load is satisfied, terminating operation of said furnaces at a heating mode in which said heating load is satisfied; and if the heating load is satisfied prior to the final heating mode, aborting initiation of operation of all heating modes subsequent to said heating mode during which said heating load is satisfied.

3. The method of claim 1 where determining the existence of a heating load to be satisfied is determined by monitoring a single-stage thermostat.

4. A method for providing a two stage heating cycle using twinned single stage furnaces, comprising a first and a second furnace, as a function of a most recent previous heating cycle comprising the steps of:

determining the existence of a heating load to be satisfied;

running blowers in both said furnaces and burners in said first furnace only, for a first time interval that does not exceed a predetermined limit, said running of said blowers in both said furnaces and burners in said first furnace only comprising a first heating mode;

running the blowers and burners in both said furnaces for a second time interval until the heating load is satisfied, said running of said blowers and burners in both said furnaces comprising a second heating mode;

calculating a thermal load requirement, as a function of said first time interval and said second time interval; and predetermining the first time interval limit, for a next cycle from the calculated thermal load requirement.

5. The method of claim 4, further comprising the steps of:

determining if the heating load is satisfied while the furnaces are operating in said first heating mode;

if the heating load is satisfied, terminating the first heating mode; and if the heating load is satisfied in the first heating mode, aborting initiation of second heating mode.

6. A method for providing three heating modes using twinned multi-stage furnaces, comprising a first and a second furnace, as a function of a most recent previous heating cycle comprising the steps of:

determining an existence of a heating load to be satisfied;

running blowers in both said furnaces and burners in said first furnace only at low fire for a first time interval that does not exceed a first predetermined limit, said running of said blowers in both said furnaces and burners in said first furnace only at low fire comprising a first heating mode;

running the blowers and burners in both said furnaces at low fire for a second time interval that does not exceed a second predetermined limit, said running of said blowers and burners in both said furnaces at low fire comprising a second heating mode;

running the blowers and burners in both said furnaces at high fire for a final time interval until the heating load is satisfied, said running the blowers and burners in both said furnaces at high fire comprising a third heating mode;

calculating a thermal load requirement, as a function of all of said time intervals; and predetermining all of said predetermined time intervals, for a next cycle from the calculated thermal load requirement.

7. The method of claim 6, further comprising the steps of:

determining if the heating load is satisfied while each furnace is operating for each given heating mode;

if the heating load is satisfied, terminating operation of a heating mode in which said heating load is satisfied; and if the heating load is satisfied prior to operation in the third heating mode, aborting initiation of operation all heating modes subsequent to said mode in which said heating load is satisfied.

* * * * *